United States Patent [19]

McDonald

[11] 4,053,032
[45] Oct. 11, 1977

[54] SELF-ACTUATING BRAKE LINKAGE

[75] Inventor: Raymond F. McDonald, Winneconne, Wis.

[73] Assignee: J. I. Case Company, Racine, Wis.

[21] Appl. No.: 732,677

[22] Filed: Oct. 15, 1976

[51] Int. Cl.² ............................................. F16D 49/00
[52] U.S. Cl. ................................................. 188/77 R
[58] Field of Search ............ 188/77 R, 77 W; 192/80

[56] References Cited

U.S. PATENT DOCUMENTS 3,841,447  10/1974  Schlapmann et al. ............. 188/77 R Primary Examiner—Duane A. Reger
Attorney, Agent, or Firm—Cullen, Settle, Sloman & Cantor

[57] ABSTRACT

An improved self-actuating linkage for a flexible band-type brake which eliminates binding or locking of the brake. The linkage includes a pair of pivotally supported L-shaped levers connected to the brake band. The levers cross and are pivotally connected to a cam member. The cam member has a pair of angularly related slots extending outwardly from a line through the axis of the drum and slidably receiving the pivotal connections to the levers. The brake is actuated by tensioning the cam member and the brake is released by movement of the cam member toward the brake drum, whereby the levers are spread within the angularly related slots to assure release of the brake band.

10 Claims, 5 Drawing Figures

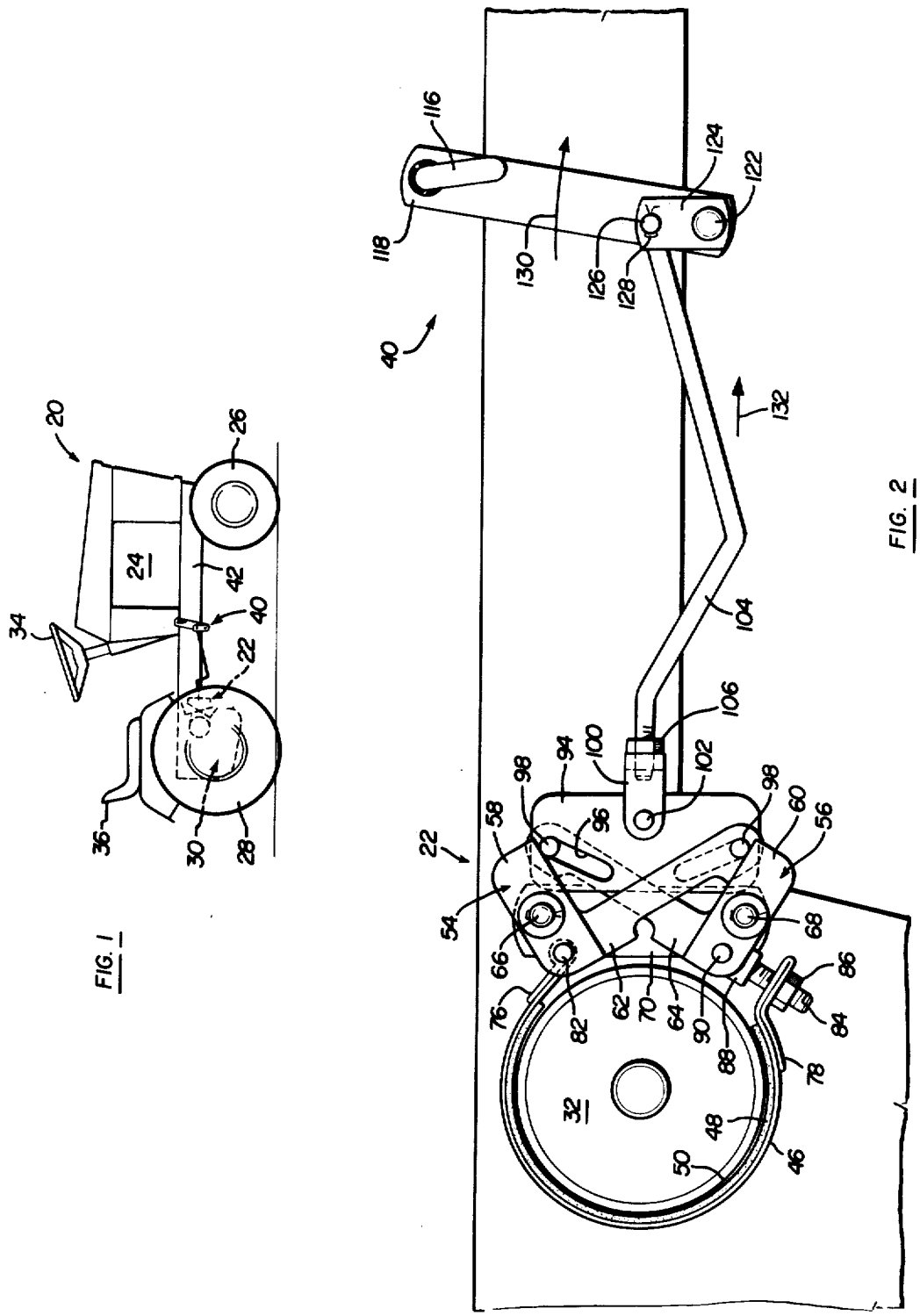

SELF-ACTUATING BRAKE LINKAGE

FIELD OF THE INVENTION

The self-actuating brake linkage of this invention is particularly adapted for flexible band-type brakes used on such vehicles as compact tractors and other small vehicles.

DESCRIPTION OF THE PRIOR ART

A self-actuating brake mechanism of the type utilized herein was disclosed in U.S. Pat. No. 3,841,447, assigned to the assignee of the instant application. As set forth therein, the conventional braking mechanism for a small or compact tractor includes a flexible brake band which frictionally engages the brake drum, stopping the drum and the vehicle. The brake band was generally fixed at one end by a pin to the tractor chassis and the opposed end was tensioned around the drum by the brake linkage connected to a brake pedal. The brake linkage disclosed in the above-referenced patent was particularly adapted to eliminate the uneven wear of the brake band by providing a self-actuating brake linkage which provide equal tension in forward and reverse.

Although the brake linkage disclosed in the above-referenced patent had several important advantages over the prior art as disclosed therein, the brake linkage was subject to binding or locking, particularly on a downhill grade. For example, the brake mechanism relied upon the brake pedal release spring to release the brake band. On a downward grade, however, the spring force was insufficient and the brake would bind. Another problem with the brake linkage disclosed in the above-referenced patent was the linkage between the levers and the floating or common link. These links tended to bind or jam and the brake return spring was insufficient to release the linkage.

The self-energizing brake linkage of the present invention utilizes a camming member which positively releases the brake band upon release of the brake pedal. Further, the linkage disclosed in the above-referenced patent has been simplified to avoid locking or binding of the linkage. The self-energizing brake linkage of the present invention has the advantages of the linkage diclosed in the above-referenced patent while elimianting the problem of binding or locking.

SUMMARY OF THE INVENTION

The improved self-actuating brake of the present invention utilizes a conventional flexible brake band having a center portion for receipt around a rotatable brake drum. As described in the above-referenced U.S. Pat. No. 3,841,447, which is incorporated herein by reference, the opposed ends of the brake band are pivotally connected to the brake actuating linkage, eliminating uneven wear of the band. The linkage includes a pair of brake actuating levers, each lever pivotally supported on the vehicle with the brake band free ends pivotally connected to the levers.

The pivotal connection of the levers to the brake band and the fixed pivot define the shorter leg of an L-shaped lever with the longer leg defined between the pivotal connection to the brake band and a pivotal connection to a cam member. It will be understood that the levers may be any shape, however the pivotal connections define the L-shape configuration described herein.

In the self-energizing brake linkage of the present invention, the longer legs of the levers are pivotally connected to a cam member having a pair of angularly related slots. The slots extend outwardly from a line drawn through the axis of the brake drum and slidably receive the pivotal connections to the levers. The brake pedal linkage is then pivotally connected to the cam member between the pivotal connections to the levers, such that the brake is actuated by tensioning the cam member as described in the above-referenced patent. When the brake pedal is released, the linkage moves the cam member toward the brake drum. In the linkage of the present invention, the angularly related slots in the cam member provide a prositive spreading force on the brake levers, assuring release of the brake band. Rearward movement of the cam member slides the pivotal connections to the levers outwardly in the angularly related slots providing positive disengagement of the brake and eliminating binding. In the preferred embodiment, the slots extend at an angle of about 20° to a line perpendicular to the diameter of the brake drum when the brake is in a relaxed position.

In the preferred embodiment of the self-actuating brake of this invention, the levers are pivotally connected to the cam member by pins projecting from the levers and received within the angularly related slots in the cam member. The present linkage thereby eliminates the separate links provided between the levers and the common or floating link which tended to bind in the above-referenced patent. Further, the levers disclosed herein may be identical, each having a bifurcated shorter leg and a plate-like longer leg, resulting in a stronger construction and a positive stop-means. In the linkage of the present invention, the rearward movement of the cam member is limited by engagement between the pins pivotally connecting the levers to the cam member and the bifurcated legs of the levers. Further, the cam plate nests within the bifurcated legs, guiding movement of the cam plate and limiting binding. This provides a simpler construction which is stronger and which eliminates binding or locking of the linkage.

Other advantages and meritorious features will be more fully understood from the following description of the preferred embodiments, the appended claims and the drawings, a brief description of which follows.

BRIEF DESCRIPTION OF THE DRAWINGS

FIG. 1 is a side view of a conventional compact tractor having the improved self-actuating brake mechanism of this invention;

FIG. 2 is a side view of one embodiment of the improved self-actuating brake mechanism of this invention;

DESCRIPTION OF THE PREFERRED EMBODIMENT

Figure 3:
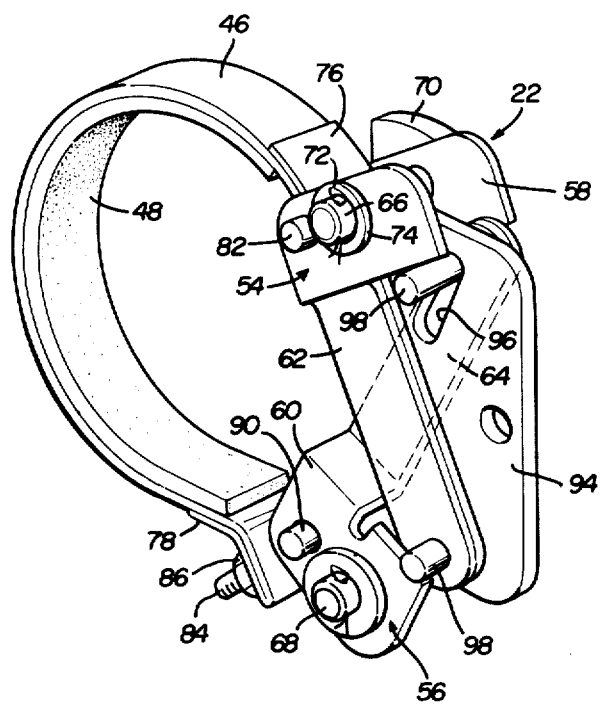
FIG. 3 is a persective view of the self-actuating brake linkage shown in FIG. 2.

FIG. 1 illustrates a conventional tractor 20, such as a compact lawn or garden tractor, which may be utilized to support or tow various implements, such as garden plows, lawn mowers or sweepers. FIG. 1 is included herein to illustrate a typical environment for the self-actuating brake mechanism 22 of this invention. As described in the above-referenced United States Patent which is incorporated herein, a tractor normally includes a motor 24, a pair of forward wheels 26 and rearward wheels 28. The rear wheels may be driven by a conventional transmission 30 and in this embodiment, the tractor includes an off-set brake drum, indicated in phantom at 32. The tractor normally includes a steering wheel 34 which is operated from a driver's seat 36. It will be understood, however, that the self-actuating brake and linkage of this invention may be utilized in any vehicle having a band-type brake and the details of the compact tractor illustrated in FIG. 1 are not claimed herein as the invention.

The brake mechanism illustrated in FIG. 1 includes a conventional side-mounted brake pedal and linkage, indicated generally at 40, mounted on the tractor chassis 42. The brake mechanism 22 includes a flexible brake band 46 having a friction lining 48 which encircles the brake drum 32 and frictionally engages the friction surface 50 of the drum. The brake lining 48 and the friction surface 50 of the drum may be formed of any conventional or suitable material, such as asbestos or various composition materials well known in the art. The brake band 46 and lining are preferably relatively flexible to encircle the drum, as shown, but are sufficiently self-supporting and resilient to release the drum upon release of the brake mechanism 22, as described below.

In the disclosed embodiment, the self-actuating brake linkage 22 includes a pair of L-shaped levers 54 and 56. Each lever includes a bifurcated shorter arm 58 and 60, respectively, and a longer arm 62 and 64, respectively, as best shown in FIG. 3. The levers and the associated linkage may be formed of any suitable material including steel. The preferred bifurcated form of the levers may be formed from two metal plates, for example, wherein the plates are spaced in the bifurcated portion 54 and 56 and welded or otherwise secured into a single plate in the portions 62 and 64. As shown, the levers 54 and 56 may be identical to reduce costs and simplify the assembly.

The levers 54 and 56 are each supported on a pin, 66 and 68, respectively, providing a fixed pivot. The pins in the disclosed embodiment are received through apertures in the bifurcated short leg 58 of the levers and welded or otherwise secured to a support plate 70. The levers are retained on the arms by cotter pins 72 and washers 74 are provided to assure ease of rotation. The plate 70 may be welded or otherwise secured to the tractor chassis 42 which supports the self-actuating linkage 22 and the brake band 46. It will be understood that the levers may be pivotally supported on the vehicle by any suitable means.

The free ends 76 and 78 of the brake band are each pivtotally connected to the levers adjacent the apex of the long and short arms. Free end 76 is connected to lever 54 by a pin 82 which extends through the bifurcated end of the arm. As shown, the free end 76 of the brake band is formed into a loop and welded or otherwise secured to receive pivot pin 82. The opposed free end 78 is folded over and a threaded bolt 84 is received through an aperture in the free end and retained in place by a nut 86. The head end of the bolt is received in a clevis 88 which is pivotally connected to the apex of lever 56 by a pin 90. The tension on the brake band may then be adjusted by threading nut 86. Further, as disclosed, this arrangement permits the utilization of identical levers 54 and 56.

Figure 4:
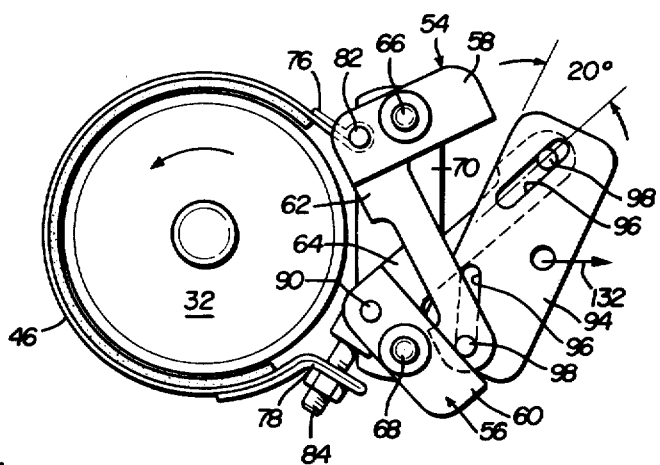
FIG. 4 is a side view of the embodiment of the self-actuating brake linkage shown in FIGS. 2 and 3 during braking, when the brake drum is rotating in a counterclockwise direction.

The long arms 62 and 64 of the levers are pivotally connected to a cam member or plate 94. The cam plate includes a pair of angularly related slots 96 which receive pivot pins 98. In the preferred embodiment, the pins 98 extend through the lever arms 62 and 64 to engage the bifurcated portion of the opposed arm, 60 and 58, respectively, to provide a stop means as described hereinbelow. The pins may be welded or otherwise secured to the levers. The slots preferably extend at a common acute angle to a line perpendicular to the diameter of the brake drum forming a camming surface for positively releasing the brake as described hereinbelow. As shown in FIG. 4, the slots are defined at a 20 degree angle to a line perpendicular to the diameter of the brake drum when the brake is in a relaxed position as shown in FIG. 2. It will be understood however that other slot angles may be used, provided the slots force the pins 98 outwardly to positively release the brake band as described.

The cam member or plate 94 is pivotally connected to the brake pedal linkage by clevis 100 and pin 102 which is received through the cam plate 94. The clevis includes a bifurcated end which is received over cam plate 94 and secured by pivot pin 102. Brake rod 104 includes a threaded end which is threadably received in an aperture in clevis 100 and accurately retained by nut 106. The effective length of brake rod 104 may thus be adjusted by adjusting nut 106.

The brake pedal and linkage 40 in the disclosed embodiment includes a brake pedal 116, which may be an L- or U-shaped rod pivotally received and secured in link 118. Link 118 is pivotally secured to the tractor chassis on a fixed pivot pin 122. A second link 124 is rigidly secured to link 118 defining a bell-crank linkage. The brake rod 104 is then pivotally secured to link 124. In the disclosed embodiment, rod 104 includes an L-shaped end which is received through an aperture in link 124 and secured in place by cotter pin 128.

The operation of the self-actuating brake linkage of this invention is then as follows. The brake is actuated by depressing or urging the brake pedal 116 forward, rotating links 118 and 124 in a clockwise direction about fixed pivot pin 122 as shown by arrow 130 in FIG. 2. The difference in length of links 118 and 124 provides a mechanical advantage to the braking force as will be understood by those skilled in the art. Rotation of links 118 and 124 will tension brake rod 104 in the direction of arrow 132. The movement of rod 104 in the direction of arrow 132 will draw cam plate 94 in the same direction, thereby rotating lever 54 in a counterclockwise direction and lever 56 in a clockwise direction, tensioning the opposed free ends 76 and 78 of the brake band and braking the brake drum 32. In the preferred embodiment, the pivot pins 98 will follow slots 96 during braking. Release of the brake pedal will return the linkage to the position shown in FIG. 2 because the linkage is spring biased. Brake rod 104 will thus move to the left in FIG. 2, moving cam plate 94 to the left. Camming slot 96 will thus provide a positive force spreading pivot pins 98 to the position shown in FIG. 2 and providing positive disengagement of the brake. In actual operation, however, the brake band is subject to unequal forces depending upon the direction of braking as described hereinbelow.

As shown in FIG. 1, the brake drum 32 may be offset, such that the brake drum rotates in the opposite direction from the wheels. Thus, the brake drum will rotate in a counterclockwise direction as shown in FIG. 4 when the vehicle is moving forward. The friction of braking tends to pull the "following end" 76 of the brake band 46, tensioning the pivotal connection 82 of lever 54. The tension on the pivot 82 will tension lever 54 in a clockwise direction around fixed pivot 66. Clockwise rotation of the lever 54 would, however, relieve the tension in the brake band 46, but is prevented from rotating by pivot pin 98 which engages the opposed bifurcated ends of short arm portion 60 of lever 56. Pins 98 thus serves as a stop means, limiting rotation of the levers toward the brake drum. The "leading" or exiting end 78 of the brake band is simultaneously tensioned in a self-actuating direction by lever 56. Upon actuation of the brake, lever 56 rotates in a clockwise direction about its fixed pivot axis 68, as shown in FIG. 4, to tension the brake band around drum 32. This tensioning of the brake band is caused by engagement of pin 98 against portion 60 of link 56. The tension on the cam plate in the direction of arrows 132 is transmitted through pin 98 to rotate lever 56 in a clockwise direction, tensioning the brake band in a self-actuating direction. As shown in FIG. 4, cam plate 94 automatically adjusts angularly to compensate for the direction of braking. When the brake is released, cam plate 94 is urged toward brake drum 32, rotating link 64 in a conterclockwise direction in slot 96 to release the brake band 46. As described, the angularly related slots provide a positive spreading force on the levers, assuring positive disengagement of the brake band. Further, the simplification of the linkage eliminates binding or locking of the linkage as described above.

Figure 5:
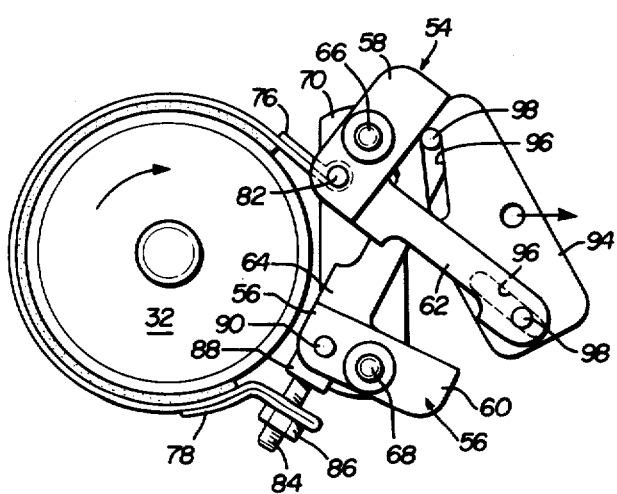
FIG. 5 is a side view of the self-actuating brake linkage similar to FIG. 4 when the brake drum is rotating in a clockwise direction.

The brake drum 32 in FIG. 5 is rotating in a clockwise direction, as when the tractor 20 is moving in reverse. It can be seen that the braking action in FIG. 5 is a mirror image of the action shown in FIG. 4. The following end of the brake band is now end 78, which tensions pivotal connection 90, tending to rotate lever 56 is a counterclockwise direction. This motion is prevented by pin 98 engaging the bifurcated end 58 of lever 54. This action rotates lever 54 in a counerclockwise direction, tensioning end 76 of the brake band in a self-actuating direction as described above. Lever 54 thus rotates in a counterclockwise direction about its fixed pivot axis 66 as shown in FIG. 5, tensioning the brake band around the drum.

It will thus be seen that the "following end" of the brake band is always fixed, regardless of the direction of rotation of the brake drum 32 and the "leading end" is tensioned by rotation of the lever pivotally connected thereto as described above. Release of the brake pedal 116 rotates the spring tensioned links 118 and 124 in a counterclockwise direction, moving brake rod 104 and cam plate 94 to the left in FIG. 2. The cam plate then spreads the long arms of the levers with the pivot pins 98 following slots 96. In the preferred embodiment, the cam plate 94 nests within the bifurcated ends 58 and 60 of the levers until pins 98 engage the bifurcated lever ends as shown in FIGS. 2 and 3. This provides a compact structure which assures accurate alignment of the linkage and positive release of the brake band.

The self-actuating brake mechanism and linkage of this invention thus provides a relatively simple manual brake, particularly for small vehicles such as lawn or garden tractors, which is equally efficient in braking the vehicle in forward and reverse. Further, the cam plate and simplified nested linkage eliminates binding or locking of the linkage as was found in the prior art. It will by understood by those skilled in the art however that the brake linkage of this invention may be modified as required within the purview of the appended claims.

I claim:

1. An improved self-actuating brake for vehicles, including a flexible brake band having a center portion for receipt around a rotatable drum, a pair of brake actuating levers, each of said levers having a first pivotal connection to one of said brake band free ends, a fixed pivot adjacent said first pivotal connection and a second pivotal connection to a cam member, said first pivotal connection and said fixed pivot defining the shorter leg of an L-shaped lever with said first and second pivotal connections defining the longer legs, said longer legs of said lever extending away from said brake band and crossing, said cam member located generally between said second pivotal connections of said levers, said cam member having a pair of angularly related slots extending generally away from said brake band and slidably receiving said second pivotal connections of said levers and a brake linkage means pivotally connected to said cam member between said second pivotal connections adapted to tension said cam member, rotating said levers about said fixed pivots to actuate said brake, release of said brake linkage means resulting in movement of said cam plate toward said brake band, whereby said cam plate spreads said lever second pivotal connections within said angularly related slot, releasing said brake band.

2. The self-actuating brake defined in claim 1, characterized in that said levers are pivotally connected to said cam member by pins projecting from said levers received within said angularly related slots in said cam member.

3. The self-actuating brake defined in claim 1, characterized in that each of said cam member slots extend at an angle of about 20° to a line perpendicular to the diameter of the brake drum when the brake is in a relaxed position.

4. The self-actuating brake defined in claim 1, characterized in that said levers are L-shaped with said shorter leg being bifurcated and said cam member comprising a plate having said angularly related slots, said bifurcated legs nestingly receiving said cam plate and providing a stop means limiting movement of said cam plate toward said brake band.

5. The self-actuating brake defined in claim 4, characterized in that said second pivotal connections comprise a pin through said lever received within said cam plate slots, said pins engaging said bifurcated leg of said lever, limiting movement of said levers and providing said stop means.

6. The self-actuating brake defined in claim 1, characterized in that said levers are identical L-shaped levers pivotally retained to a support plate by said fixed pivot, said support plate adapted to be secured to a vehicle adjacent the brake drum.

7. A self-actuatig brake for vehicles having a rotatable brake drum, a flexible brake band for receipt around the vehicle brake drum, a pair of generally L-shaped levers each having a bifurcated short leg and a flat long leg, the short leg of each of said levers pivotally supported on a fixed pivot, the long legs of said levers extending away from said brake band, crossing and pivotally connected to a cam member partially nestable within said bifurcated lever legs, each of said levers pivotally connected to one of the free ends of said brake band adjacent the apex of said legs and said cam member having a pair of angularly related slots extending outwardly from a line through the axis of the brake drum slidably receiving the pivotal connections of said levers, whereby the brake may be actuated by tensioning said cam member and the brake band is released by movement of said cam member toward said band, spreading said levers within said angularly related slots of said cam member.

8. The self-actuating brake defined in claim 7, characterized in that said levers are pivotally connected to said cam member by pins projecting from said levers and received within said angularly related slots in said cam member.

9. The self-actuating brake defined in claim 8, characterized in that said pins extend through said levers to engage the bifurcated leg of said levers, limiting movement of said cam member toward said brake band.

10. The self-actuating brake defined in claim 7, characterized in that said cam member is a plate having said angularly related slots, said slots extending at an angle of less than 90° to a line through the axis of the brake drum and said cam plate nestingly receivable within the bifurcated legs of said levers.

* * * * *